United States Patent
Glik et al.

(10) Patent No.: US 9,955,492 B2
(45) Date of Patent: Apr. 24, 2018

(54) METHODS AND ARRANGEMENTS TO SCHEDULE COMMUNICATIONS

(71) Applicant: INTEL IP CORPORATION, Santa Clara, CA (US)

(72) Inventors: Michael Glik, Kfar Saba (IL); Solomon B. Trainin, Haifa (IL); Ophir Edlis, Modiin (IL); Ofir Artstain, Natania (IL); Elad Levy, Rishon LeZion (IL)

(73) Assignee: INTEL IP CORPORATION, Santa Clara, CA (US)

( * ) Notice: Subject to any disclaimer, the term of this patent is extended or adjusted under 35 U.S.C. 154(b) by 25 days.

(21) Appl. No.: 14/184,721

(22) Filed: Feb. 20, 2014

(65) Prior Publication Data

US 2015/0237647 A1    Aug. 20, 2015

(51) Int. Cl.
  *H04W 72/12* (2009.01)
  *H04W 52/02* (2009.01)
  *H04W 72/04* (2009.01)
  *H04W 74/00* (2009.01)

(52) U.S. Cl.
  CPC ....... *H04W 72/12* (2013.01); *H04W 52/0216* (2013.01); *H04W 72/04* (2013.01); *H04W 72/0446* (2013.01); *H04W 74/00* (2013.01); *Y02B 60/50* (2013.01)

(58) Field of Classification Search
  CPC . H04W 72/12; H04W 72/1263; H04W 52/02; H04W 24/00; H04W 52/0229; H04L 29/06; H04L 29/06068; H04L 69/08; G06F 13/00; H04B 5/0031; H04B 5/0075
  See application file for complete search history.

(56) References Cited

U.S. PATENT DOCUMENTS

| | | |
|---|---|---|
| 2008/0004067 A1 | 1/2008 | Piipponen et al. |
| 2008/0025341 A1 | 1/2008 | Rao et al. |
| 2010/0091691 A1 | 4/2010 | Dorsey et al. |
| 2011/0075642 A1* | 3/2011 | Cordeiro .......... H04W 74/0816 370/338 |

(Continued)

OTHER PUBLICATIONS

Li, Wireless Wire—Ultra Low-Power and High Data Rate Wireless Communication Systems.*

(Continued)

*Primary Examiner* — Jae Y Lee
*Assistant Examiner* — Aixa Guadalupe-Cruz

(57) ABSTRACT

Logic may allocate time slots in a schedule with consideration of thermal dissipation capacities of non-PCP devices. Logic may determine the failure to use a full time slot allocation by a non-PCP device when the non-PCP device has more data to transmit. Logic may determine an adjustment for a schedule based upon duty cycle information provided by a non-PCP device. Logic may receive an indication of a duty cycle. Logic may determine an adjustment to a schedule based upon entrance of the non-PCP device into a power save mode during an incomplete communication with time remaining in the allocated time slot. Logic may determine a duty cycle based upon a thermal measurement. Logic may request a reduced duty cycle based upon a risk of reaching an overheat limit for a non-PCP device. And logic may request an increase in the duty cycle in response to favorable thermal characteristics.

25 Claims, 6 Drawing Sheets

(56) References Cited

U.S. PATENT DOCUMENTS

2013/0266026 A1* 10/2013 McCormack ........... G06F 13/00
  370/474
2013/0272272 A1* 10/2013 Sudak ............... H04W 72/0446
  370/336
2013/0329576 A1* 12/2013 Sinha ................ H04W 52/0229
  370/252
2014/0023053 A1    1/2014 Park et al.

OTHER PUBLICATIONS

International Search Report and Written Opinion received for PCT Patent Application No. PCT/US2015/016716, dated May 19, 2015, 13 Pages.
International Preliminary Report on Patentability received for PCT Patent Application No. PCT/US2015/016716, dated Sep. 1, 2016, 10 pages.

* cited by examiner

FIG. 2A

| FRAME OCTETS | 2060 VAR | |
|---|---|---|
| MAC HEADER 2061 | PAYLOAD 2084 | FCS 2086 |
| FRAME CONTROL 2063 | ACTIVE DUTY CYCLE IE 2100 | |

FIG. 2B

INFORMATION ELEMENT 2100

| ELEMENT ID 2102 | LENGTH 2104 | OUI ID 2106 | TYPE 2108 | SUB-TYPE 2110 | DATA 2112 |
|---|---|---|---|---|---|
| 222 | VAR | 0x001735 | 0x10 | ACTIVE DUTY CYCLE | SUPPORTED ACTIVITY TIMES |

FIG. 2C

| FRAME OCTETS | 2200 VAR | |
|---|---|---|
| MAC HEADER 2061 | PAYLOAD 2084 | FCS 2086 |
| ACTIVE DUTY CYCLE 2210 | | |

FIG. 2D

| FRAME OCTETS | 2300 VAR | |
|---|---|---|
| MAC HEADER 2061 | PAYLOAD 2084 | FCS 2086 |
| FRAME CONTROL 2303 | PWR MGT 2305 | MORE DATA 2308 |

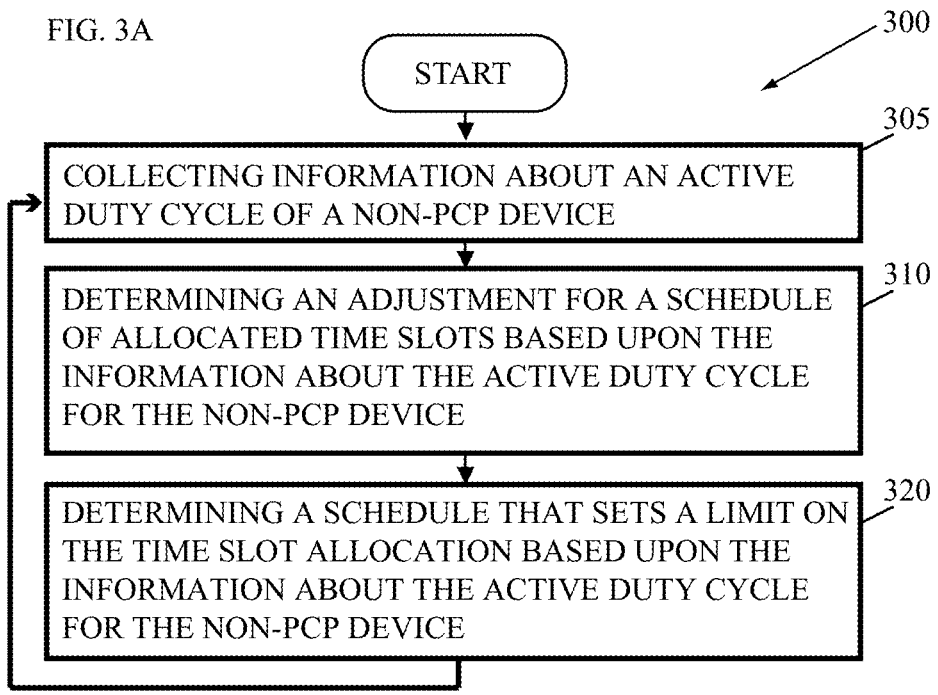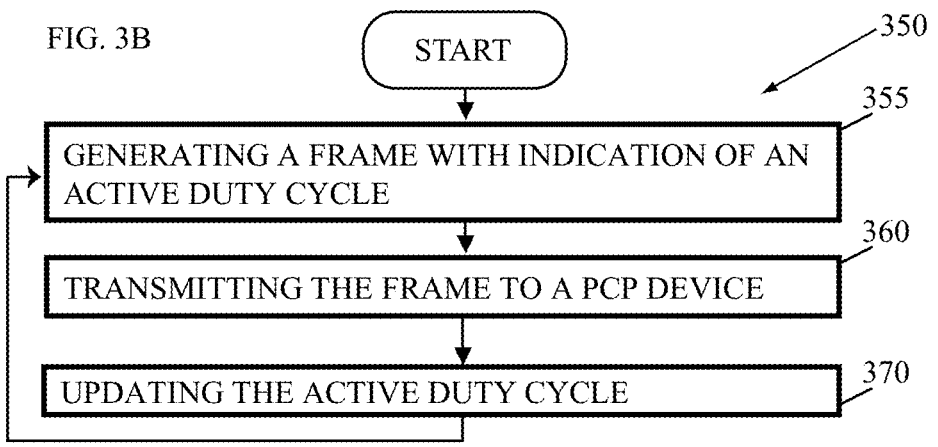

METHODS AND ARRANGEMENTS TO SCHEDULE COMMUNICATIONS

TECHNICAL FIELD

Embodiments are in the field of wireless communications. More particularly, embodiments may involve scheduling communications in an efficient manner that considers the thermal dissipation of the schedule devices.

BACKGROUND

The Wireless Gigabit Alliance (WiGig) and Institute of Electrical and Electronic Engineers (IEEE) 802.11ad are developing a multigigabit wireless personal and local area network (WPAN/WLAN) specification in the 60 Gigahertz (GHz) millimeter wave band. Chipset manufacturers, original equipment manufacturers (OEMs), and telecom companies are also assisting in this development. 60 GHz millimeter wave (mmWave) transmission will scale the speed of WLANs and WPANs to 6.75 Gbit/s over distances less than 10 meters. The high throughput for WiGig communications results in a significant amount of heat that must be dissipated to perform appropriately, prevent damage to the device, and be safe to operate in various environments. Manufacturers have different designs to dissipate the heat generated by one or more chips or silicon-based devices used to implement the WiGig communications, some designs including heat sinks to dissipate heat, some designs including fans to dissipate heat, some using the product case to dissipate heat, some using ventilation holes in the case, and others using a combination of these or other heat dissipation techniques.

The personal basic service set (PBSS) control point (PCP) is the device in a WiGig network that coordinates data transmission schedules between devices on the network and between the devices and the PCP. However, the PCP has no information about the thermal dissipation capabilities of the non-PCP devices on the network so the PCP schedules time slots for communications by the non-PCP devices without consideration of thermal dissipation capabilities of the non-PCP devices.

BRIEF DESCRIPTION OF THE DRAWINGS

FIG. 2A depicts an embodiment of a management frame to transmit a duty cycle;

FIG. 2B depicts an embodiment of an information element to transmit a value indicative of a duty cycle;

FIG. 2C depicts an embodiment of a new message comprising a field with a duty cycle;

FIG. 2D depicts an embodiment of a message comprising a frame control field with a power management subfield and a more data subfield;

FIGS. 3A-B depict embodiments of flowcharts to adjust the schedule of a non-personal basic service set (PBSS) control point (PCP) device and to transmit information about a duty cycle to a PCP device.

DETAILED DESCRIPTION OF EMBODIMENTS

Figure 1:
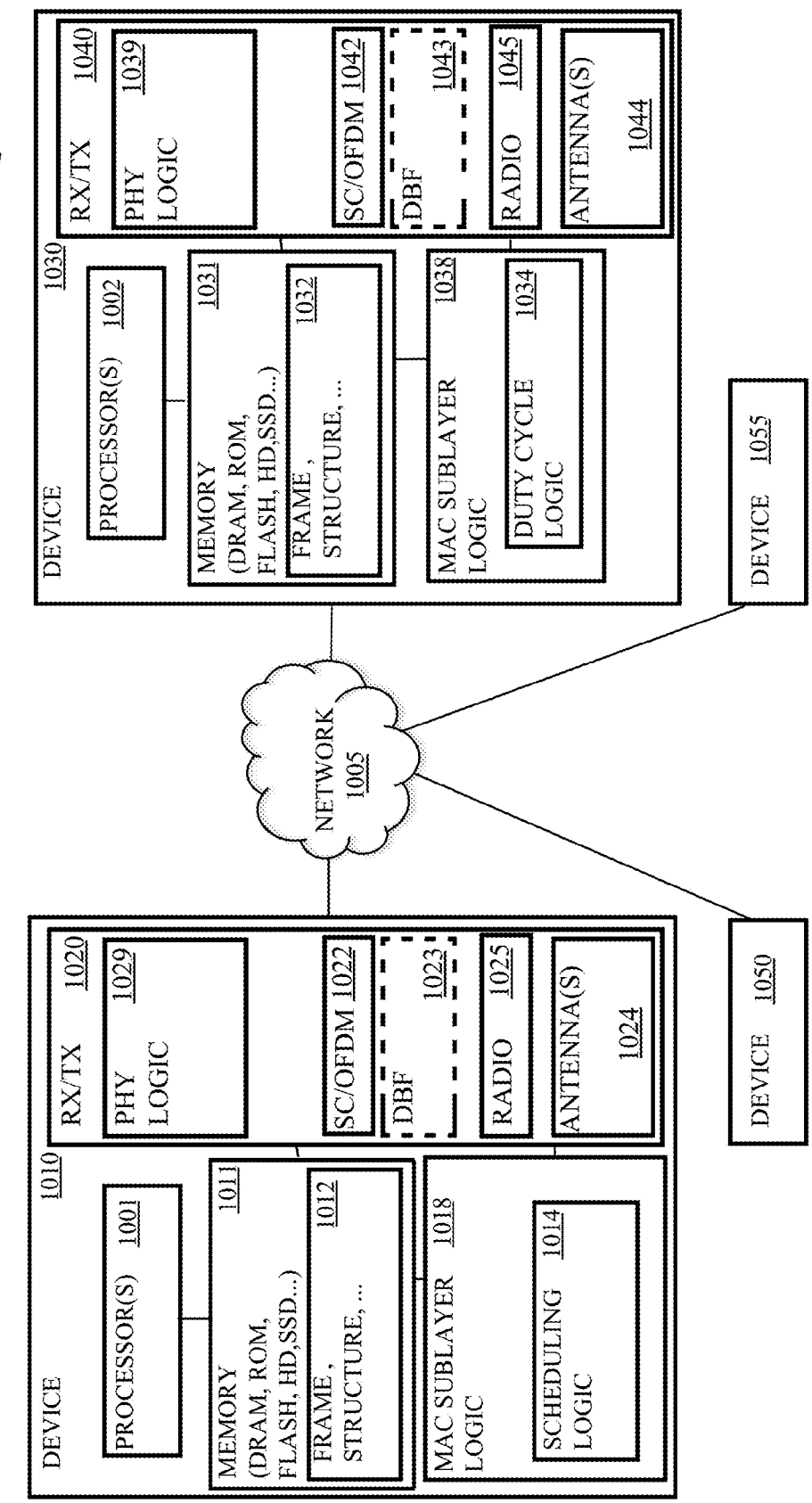
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The personal basic service set (PBSS) control point (PCP) is the device on a WiGig network that coordinates data transmission schedules between non-PCP devices on the network and between the non-PCP devices and the PCP device. The PCP device allocates resources and schedules time slots for communications by the non-PCP devices based on the traffic requirements and participating devices capabilities negotiated during connection establishment. The device capabilities are derived from processing power, memory budget of the device and its reception/transmission supported bandwidth. Power dissipation puts a long lasting average bar that must not be crossed. Power dissipation targets might slowly change during activity, as a result of ambient conditions and actual dissipation of other components in the system. For instance, if there are two non-PCP devices in the network, the PCP device may allocate half of the beacon interval to the first non-PCP device and half of the beacon interval to the second non-PCP device for transmitting data based upon the devices' capabilities. However, the first and second non-PCP devices may have different thermal dissipation capabilities due to different designs. As a result, the first non-PCP device may transmit data during the entire time slot assigned to the first non-PCP device. The second non-PCP device, on the other hand, may use one tenth of the time allocated to the second non-PCP device and shut down. Since the time slot is allocated to second non-PCP device, the remainder of the time slot allocation may be unused, detracting for the overall system throughput.

Embodiments may adjust the allocation of link resources based upon the thermal dissipation capabilities of the non-PCP devices and possibly other factors that limit the duty cycle of the non-PCP devices to prevent "overscheduling". Some embodiments may collect information about the duty cycle capabilities of the non-PCP devices at the association stage. In several of these embodiments, the non-PCP device may transmit a new management message and/or information element that includes an active duty cycle field. In some embodiments, the non-PCP device may transmit a onetime submission of a targeted active duty cycle based on offline measurements reflecting differences between WiGig power dissipation and platform thermal limits. In some embodiments, the non-PCP device may track its actual dissipation and/or platform thermal measurements and make an occasional request to lower the duty cycle every time an overheat limit is at risk. And in some embodiments, the non-PCP device may determine that thermal characteristics allow duty cycle to increase so the non-PCP device may make an occasional request to increase the duty cycle.

To illustrate, the first non-PCP device may request an increased duty cycle and the second non-PCP device may request a reduced duty cycle by transmitting the new management frame, or message, with the active duty cycle indicator or the information element in an existing management frame with the active duty cycle indicator. The PCP device may honor the requests to the extent possible.

In other embodiments, the PCP device may monitor activities of the first-non-PCP device and the activities of the second non-PCP device to determine if the second non-PCP device is shutting down during its time slot despite having more data to transmit and/or to determine that the first non-PCP device is using the entire time slot allocated to the first non-PCP device. If the second non-PCP device is not using the entire time slot despite having more data to transmit then the second non-PCP device is likely reaching a thermal limit and shutting down to cool off. So the PCP device may determine that reallocating at least a portion of the time slot allocated to the second PCP device may be more an efficient allocation. If the first non-PCP device is transmitting during its entire time slot or at least until all communications are completed, the PCP device may determine that the first non-PCP device may be able to use additional time. Thus, the PCP device may generate a new schedule with an increased duty cycle for the first non-PCP device and a shortened duty cycle for the second non-PCP device.

In many embodiments, the PCP device may determine a non-PCP device is entering a power save mode based upon an indication in a frame from the non-PCP device such as a power management bit being set in a frame. In several embodiments, the PCP device may determine that the non-PCP device may still have data to transmit when the non-PCP device enters a power save mode by a bit being set in a frame such as a more data bit, a more fragments bit, and/or the like.

In some embodiments, the non-PCP device may enter the power save mode prior to completion of a transmission from the PCP device to the non-PCP device. For instance, the PCP device may receive a request to quit transmitting data along with an indication that the non-PCP device is entering a power save mode.

Various embodiments may be designed to address different technical problems associated with allocating time slots in a schedule with consideration of thermal dissipation capacities of non-PCP devices. Other technical problems may include determining thermal information for non-PCP devices, collecting thermal information for non-PCP devices, and/or the like.

Different technical problems such as those discussed above may be addressed by one or more different embodiments. For instance, some embodiments that address allocating time slots in a schedule with consideration of thermal dissipation capacities of non-PCP devices may do so by one or more different technical means such as determining the failure to use a full time slot allocation by a non-PCP device when the non-PCP device has more data to transmit, determining an adjustment for a schedule based upon duty cycle information provided by a non-PCP device, determining an adjustment to a schedule based upon entrance of the non-PCP device into a power save mode during an incomplete communication with time remaining in the allocated time slot, determining an adjustment to a schedule based upon an underutilization of an allocated time slot for the non-PCP device, transmitting a duty cycle, determining a duty cycle based upon a thermal measurement, requesting a reduced active duty cycle based upon a risk of reaching an overheat limit for a station, requesting an increase in the active duty cycle in response to favorable thermal characteristics, determining the thermal measurement related to a current duty cycle based upon at least one of power dissipation related to communications and thermal limits associated with the non-PCP device, generating a data frame by a non-PCP device with an indication that the non-PCP device is to enter a power save mode prior to completion of a communication with the PCP device, and/or the like.

Some embodiments implement WirelessHD Specification Version 1.1D1, May 2010. Several embodiments may implement Ecma International, Standard ECMA-387, High Rate 60 GHz PHY, MAC and PALS, 2nd Ed., December 2010. Further embodiments may implement Wireless Gigabit Alliance, WiGig 1.1 specification, June 2011. Some embodiments implement Institute of Electrical and Electronic Engineers (IEEE) 802.11 systems such as IEEE 802.11ad systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Some embodiments implement Institute of Electrical and Electronic Engineers (IEEE) 802.15 systems such as IEEE 802.15.3 systems and other systems that operate in accordance with standards such as the IEEE 802.15, IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs), IEEE Computer Society, The Institute of Electrical and Electronics Engineers, Inc., 3 Park Avenue, New York, N.Y., 29 Sep. 2003.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi", or wireless fidelity).

Some embodiments, implement the Bluetooth® specification (e.g. BLUETOOTH SPECIFICATION Version 4.0, Bluetooth SIG, Inc., Publication date: 30 Jun. 2010). The embodiments, however, are not limited to these standards.

Several embodiments comprise Personal Basic Service Set (PBSS) Central Point, or PCP for and/or client devices of PCPs or stations (STAs) such as docking stations, routers, switches, servers, workstations, netbooks, mobile devices (Ultra book, Laptop, Smart Phone, Tablet, and the like).

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny, and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The examples are not limited in this context.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise a docking station that functions as a Personal Basic Service Set (PBSS) Control Point (PCP). Note that in many embodiments, each communications device can act as the PCP or the non-PCP, depending upon the implementation.

The communications device 1030 may comprise a low power communications device such as a consumer electronics device, a personal mobile device, an ultra-book, or the like, that functions as a non-PCP device in the network of the communications device 1010. And communications devices 1050 and 1055 may comprise printers, laptops, netbooks, cellular phones, smart phones, PDAs, or other wireless-capable devices that also operate as non-PCP devices. Thus, communications devices may be communicatively coupled and mobile or fixed.

The communications device 1010 may utilize antenna(s) 1024 to communicate within one or more stations, such as communication devices 1030, 1050, and 1055, via one or more antenna sectors. One of the stations, such as the communications device 1010, may act as a network coordinator (such as a Personal BSS Central Point, or PCP) to coordinate communications among the plurality of communication devices 1030, 1050, and 1055 and control access to the wireless medium. When acting as the network coordinator, the communications device 1010 may broadcast a beacon frame that indicates the length of a beacon interval during which communications are to take place. The various stations may receive the beacon frame and, thereby, become informed as to when the next beacon interval will occur.

Each of the communications devices 1010, 1030, 1050, and 1055, may have different thermal dissipation systems and each may monitor their own thermal dissipation and thermal limits to ensure that the devices do not incur or cause damage from excessive heat build-up in the devices. The communications device 1010 may comprise scheduling logic 1014 to monitor thermal dissipation related characteristics to the extent that these characteristics impact the duty cycle capabilities and, thereby, the efficiencies of allocations of time slots to the devices 1030, 1050, and 1055 during beacon intervals (BIs).

In some embodiments, the communications device 1010 may implement a coordinated (centralized) method of management for scheduling access windows for communications during beacon intervals among and between the communications devices 1010, 1030, 1050, and 1055. For embodiments that implement the coordinated method, the scheduling logic 1014 may receive duty cycle information from each of the communications devices 1030, 1050, and 1055 upon association with the communications device 1010. In many embodiments, the scheduling logic 1014 may receive an action message or management message with an information element that comprises a field including data indicative of a duty cycle from the duty cycle logic such as duty cycle logic 1034 of the communications device 1030. FIGS. 2A-B illustrate an embodiment of such a message.

In further embodiments, the duty cycle information may arrive in the form of a new management message that comprises a field including data indicative of a duty cycle from the duty cycle logic such as duty cycle logic 1034 of the communications device 1030. FIG. 2C illustrates an embodiment of such a message.

The scheduling logic 1014 may receive the messages from each of the communications devices 1030, 1050, and 1055, and store the indications of the duty cycle of each for use in generating a schedule of time slots assigned to the communications devices 1030, 1050, and 1055 in subsequent beacon intervals. The indications of the duty cycle may comprise indications of the amount of time that each of the communications devices 1030, 1050, and 1055 can transmit data and can receive data during a time period. For instance, the communications device 1030 may present information indicative of an ability to transmit for 200 milliseconds and receive for 400 milliseconds during each one-second (or 1000 millisecond) period of time. In other words, the communications device 1030 may indicate that the communications device 1030 has the capability to transmit data 20% of a cycle, receive data during 40% of a cycle, and remain inactive for 40% of the cycle. Note that the indication of the duty cycle can be presented in many different numerical forms but they effectively provide some indication of the amount of time that the devices can remain active during a period of time such as a beacon interval.

The duty cycle logic 1034 may determine a duty cycle for the communications device in a number of different ways. Initially, the duty cycle may be a default setting based upon theoretical limits placed on the communications device 1030 and stored in memory such as the memory 1031 of the communications device 1030. In further embodiments, the duty cycle logic 1034 may determine the duty cycle of the communications device 1030 heuristically and periodically update the duty cycle. Note that a limiting factor in many communications devices such as the communications device 1030 may be a thermal dissipation capability along with the thermal limit or threshold. The duty cycle logic 1034 may monitor the thermal dissipation from the physical layer device, transceiver (RX/TX) 1040 or may simply measure and monitor the temperatures in the communications device 1030 and compare these temperatures with one or more thermal limits of the communications device 1030.

If the thermal dissipation capability of the device is surpassed by the heat generated by the transceiver 1040 during communications, the heat will build-up within the communications device 1030 and the device must discontinue communication for a period sufficient to dissipate the heat build-up. In many embodiments, algorithms designed to protect the communications device 1030 from damage may update the duty cycle information based upon actual performance of the communications device 1030, changes in the performance of heat dissipation over time, and changes in environmental factors such as the ambient temperature.

The scheduling logic 1014 of the communications device 1010 may consider the indication of the duty cycle to be an upper limitation on the ability to transmit and receive data during assigned time slots in the schedule so the scheduling logic 1014 may adjust the schedule of assigned time slots to the communications device 1030 and the other devices 1050 and 1055 based upon their respective indications of their duty cycles.

After the communications device 1030 operates in the network 1005 with the communications device 1010 for a period of time, the duty cycle logic 1034 of the communications device 1030 may determine a new duty cycle such as a duty cycle that is lower based upon a risk of reaching a thermal limit. Thereafter, the MAC sublayer logic 1038 of the communications device 1030 may generate a message based upon a frame such as the frame 2060 in FIG. 2A with an update to the duty cycle information in the active duty cycle information element 2100 along with an explicit or implicit request to reduce the time slot allocations to the communications device 1030 to conform the time slot allocations to the new duty cycle.

In other embodiments, the communications device 1030 may determine that the duty cycle for the communications device 1030 may increase due to better thermal dissipation performance than the previously submitted duty cycle provided for so the communications device 1030 may increase the active portion in the indication of the duty cycle and transmit the new or updated duty cycle to the communications device 1010 with an explicit or implicit request to increase the time allocations in the scheduled time slots for the communications device 1030 based upon the updated duty cycle. In many embodiments, the implicit request for an increase in the time slot allocations may be the presentation of the updated duty cycle. In further embodiments, one or more bits included in the message with the indication of the duty cycle may represent an explicit request.

Figure 2E:
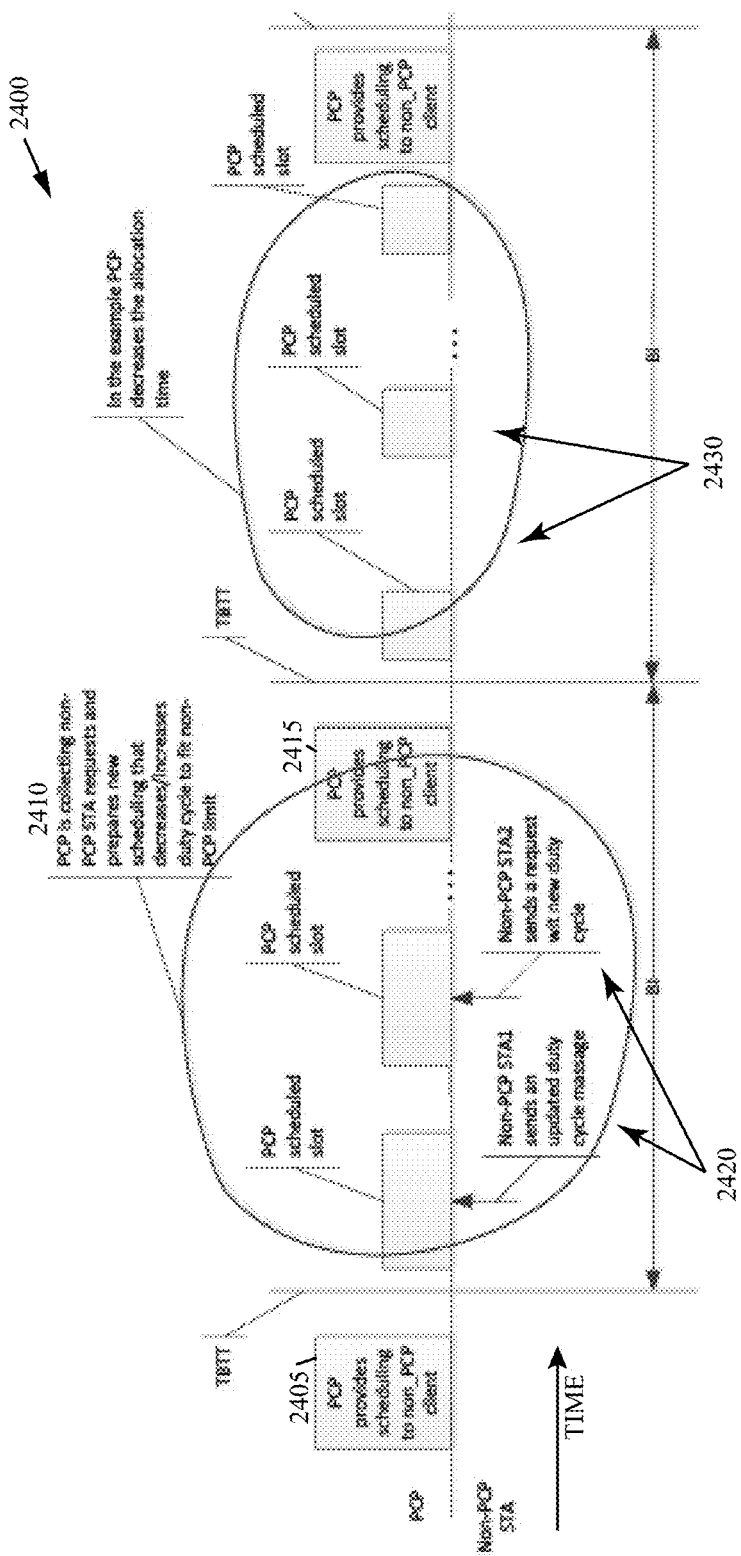
FIG. 2E depicts an embodiment of successive beacon intervals that illustrate PCP scheduled time slots prior to and after the non-PCP devices transmit updated or new duty cycles in messages such as illustrated in FIGS. 2A-C to a PCP device.

FIGS. 2A-C and 2E illustrate the coordinated (centralized) method of determining a schedule of time slot allocations that accommodate thermal dissipation capabilities of the (non-PCP devices) communications devices 1030, 1050, and 1055. Referring also to FIG. 2A, there is shown a medium access control (MAC) frame 2060 that includes an active duty cycle information element (IE) 2100. The frame 2060 comprises an embodiment of an action message or a management message. The frame includes a MAC header 2061. The MAC header 2061 may comprise a number of different fields in addition to the frame control field 2063 shown herein. In some embodiments, for example, the MAC header 2061 may comprise address fields, a service set identifier field, and possibly other fields. The frame control field 2063 may comprise subfields such as the type and sub-type of the message to identify the message to the MAC sublayer logic such as the MAC sublayer logic 1018.

In addition to the MAC header 2061, the MAC frame 2060 may comprise a payload field 2084 and a frame check sequence field 2086. The payload field 2084 may comprise one or more frames also referred to as MAC sublayer Service Data Units (MSDUs). The payload field 2084 may be a variable number of octets and may include data elements such as one or more fragments as well as control elements, parameters, and capabilities. In the present embodiment, the payload field 2084 may comprise an active duty cycle IE 2100. The FCS field 2086 may include extra checksum characters added to the frame 2060 for error detection and correction such as a cyclic redundancy check value.

An embodiment of the active duty cycle IE 2100 is illustrated in FIG. 2B. The active duty cycle IE 2100 is introduced to communicate supported duty cycles from the non-PCP device to the PCP device. Once operating non-PCP device approaches the predefined thermal thresholds, it may communicate to the PCP device a new activity duty cycle target. Upon reception of the frame 2060 with the active duty cycle IE 2100, in many embodiments, the PCP device may honor the request and change the scheduling parameters to answer the request. In several embodiments, the new PCP scheduling may not create a duty cycle that exceeds the request from non-PCP device.

The active duty cycle IE 2100 comprises an element identifier (ID) 2102, a length 2104, Vendor (OUI) ID 2106, type 2108, sub-type 2110, and data 2112. The element identifier (ID) 2102 has an example value of "222" that identifies the type of information element. The length 2104 includes the length of the information element 2100. The vendor (OUI) ID 2106 includes a unique vendor serial number. The type 2108 describes the type of the information element as an "active duty cycle" sub-type. And the data 2112 includes data indicative of the active duty cycle, or duty cycle. For instance, the data 2112 may include values such as 200/400/1000 or 2/4/10 or 2/4, or the like to indicate that the transmission duty is 200 of 1000 milliseconds and the reception duty is 400 of 1000 milliseconds.

Referring now to FIG. 2C, there is shown another embodiment of a frame 2200 for a message that can include an indication of a duty cycle for a non-PCP device such as the communications device 1030. This frame 2200 may be the same as the frame 2060 except that the indication of the active duty cycle 2210 may be included as a field in the MAC header 2061. Note that there are many different ways to convey the duty cycle information so these are just illustrations of some embodiments. Note also the active duty cycle is a duty cycle.

FIG. 2E depicts an embodiment 2400 of successive beacon intervals that illustrate PCP scheduled time slots prior to and after the non-PCP devices transmit updated or new duty cycles in messages such as message illustrated in FIGS. 2A-C to a PCP device. Prior to the first target beacon transmission time (TBTT), the PCP device such as the communications device 1010 transmits a scheduling to the non-PCP devices 2405 such as the communication devices 1030, 1050, and 1055. The time slots assigned to the non-PCP devices are illustrated as rectangles. During each of the time slots, the respective non-PCP devices transmit duty cycle messages to the PCP device 2420. The scheduling logic of the PCP device collects the information about the duty cycles 2410 and prepares and transmits a new scheduling to the non-PCP devices 2415.

In the next beacon interval (after the TBTT), it can be seen that the PCP scheduled time slots 2430 have decreased in duration. The scheduling logic of the PCP device has reduced the time slots durations for each of the non-PCP devices in response to shorter duty cycle indications in the messages transmitted to the PCP device.

Referring again to FIG. 1, in some embodiments, the communications device 1010 may implement a non-coordinated (distributed) method of management for scheduling access windows for communications during beacon intervals among and between the communications devices 1010, 1030, 1050, and 1055. For embodiments that implement the non-coordinated method, the scheduling logic 1014 may determine duty cycle information from each of the communications devices 1030, 1050, and 1055 based upon actions performed by the communications devices 1030, 1050, and 1055. In many embodiments, the scheduling logic 1014 may determine a scheduling of time slots assigned to the communications devices 1030, 1050, and 1055 and transmit the scheduling to the communications devices 1030, 1050, and 1055.

The communications devices 1030, 1050, and 1055 may or may not be capable of utilizing the entire time slots assigned to the devices. For example, the communications device 1030 may be assigned a one second time slot. The communications device 1030 may transmit data to the communications device 1010 for 100 milliseconds, receive data from the communications device 1010 for 200 milliseconds, and transmit and indication to the communications device 1010 to stop transmitting such as a message with a power management field in the frame control field set to a logical one to indicate that the communications device 1030 is entering a power save mode. The communications device 1030 is truncating the time slot of one second to 300 milliseconds. The scheduling logic 1014 may collect information such as the underutilization of the time slot by the communications device 1030 and the termination of the data transmission from the communications device 1010 to the communications device 1030 while the communications device 1010 still had more data to transmit to the communications device 1030. In many embodiments, the scheduling logic 1014 may determine that the underutilization of the time slot combined with the indication that the communications device 1030 is entering a power save mode is responsive to or has a high probability of being responsive to a thermal dissipation issue. As a result, the scheduling logic 1014 may determine to reduce the time slot allocation to the communications device 1030 in the next schedule of assigned time slots transmitted to the communications device 1030.

In many embodiments, the scheduling logic 1014 may look for a termination of a transmission of data to or from the communications device 1030 along with an indication of the entrance into a power save mode as a communication to the communications device 1010 about the duty cycle of the communications device 1030 because the communications device 1030 is at risk of reaching or exceeding a thermal dissipation limit or a thermal limit. In some embodiments, an abrupt termination of an ongoing transmission may be considered communication of a limitation of the duty cycle of the communications device 1030 and sufficient reason to reduce the time slot allocation. In several embodiments, if the communications device 1030 terminates a transmission of an aggregated package before the end of the time slot, the scheduling logic 1014 may determine that the thermal limit has been reached or exceeded and may, in response, adjust the scheduling for the communications device 1030 to reduce the duty cycle.

Referring now to FIG. 2D, there is shown another embodiment of a frame 2300 for a message that can include an indication of a non-PCP device entering a power save mode as well as a more data indication. This frame 2300 may be the same as the frame 2060 except that the indication of the active duty cycle 2210 is not included and the frame control field 2303 illustrates two of the field's subfields: the power management subfield 2305 and the more data subfield 2308. The power management subfield 2305 may be set to indicate that a device is about to enter a power save mode. The more data subfield 2308 is one example of a way to communicate from the non-PCP device to the PCP device that there is still more data to transmit. Note that there are many different ways to convey this duty cycle information so these are just illustrations of some embodiments.

Figure 2F:
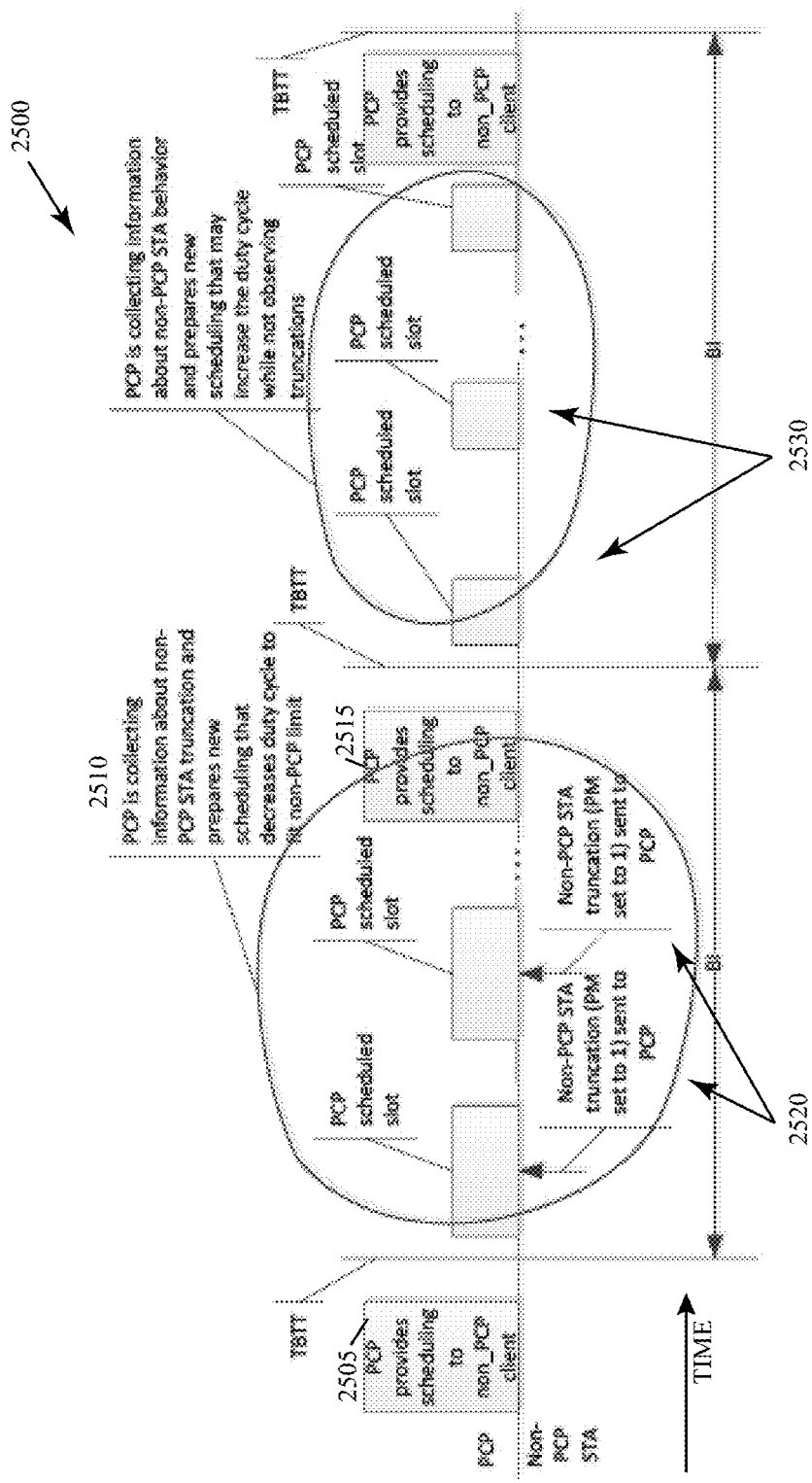
FIG. 2F depicts an embodiment of successive beacon intervals that illustrate PCP scheduled time slots prior to and after the scheduling logic of the PCP device determines updated or new duty cycles for non-PCP devices.

FIG. 2F depicts an embodiment 2500 of successive beacon intervals that illustrate PCP scheduled time slots prior to and after the PCP device determines updated or new duty cycles for one or more non-PCP devices. Prior to the first target beacon transmission time (TBTT), the PCP device such as the communications device 1010 transmits a scheduling the to the non-PCP devices 2505 such as the communication devices 1030, 1050, and 1055. The time slots assigned to the non-PCP devices are illustrated as rectangles. During each of the time slots, the non-PCP devices truncate the time slots and transmit a message with the power management field set to a logical one during their respective time slots 2520. The scheduling logic of the PCP device collects this information about the duty cycles 2510 and prepares and transmits a new scheduling to the non-PCP devices 2515.

In the next beacon interval (after the TBTT), it can be seen that the PCP scheduled time slots 2530 have decreased in duration. The scheduling logic of the PCP device has reduced the time slots durations for each of the non-PCP devices in response to shorter duty cycle indications in collected by monitoring the activities of the non-PCP devices.

In case there is no truncation observed, in some embodiments, the scheduling logic might decide to increase the duty cycle if the non-PCP device lowers the MCS from, e.g., MCS 24 to MCS 13 or to MCS 12, which may indicate lowering of power dissipation that allows the non-PCP STA to utilize longer slots.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, the network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise any data processing device such as a microprocessor, a microcontroller, a state machine, and/or the like, and may execute instructions or code in the memory 1011 and 1031. The memory 1011 and 1031 may comprise a storage medium such as Dynamic Random-Access Memory (DRAM), read only memory (ROM), buffers, registers, cache, flash memory, hard disk drives, solid-state drives, or the like. The memory 1011 and 1031 may be coupled with the MAC sublayer logic 1018, 1038 and/or may be coupled with the PHY device, transceiver 1040. In many embodiments, the memory 1011 and 1031 may store the frames and/or the frame structures, and the memory 1011 and 1031 may store frame headers or portions thereof. In many embodiments, the frames may comprise fields based upon the structure of the standard frame structures identified in IEEE 802.11.

The MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1029, 1039. The PHY logic 1029, 1039 may generate physical layer protocol data units (PPDUs) based upon the frames. More specifically, the frame builders may generate frames and the data unit builders of the PHY logic 1029, 1039 may prepend the frames with preambles to generate PPDUs for transmission via a physical layer (PHY) device such as the transceivers (RX/TX) 1020 and 1040.

The frame, also referred to as MAC layer Service Data Units (MSDUs), may comprise, e.g., a management frame. For example, a frame builder may generate a management frame such as the beacon frame to identify the communications device 1010 as having capabilities such as supported data rates, power saving features, cross-support, and a service set identification (SSID) of the network to identify the network to the communications device 1030. The MAC sublayer logic 1018 may pass the frame to the PHY logic 1029 and the PHY logic 1029 may prepend a preamble to generate a PHY frame prior to transmitting the PHY frame.

The communications devices 1010, 1030, 1050, and 1055 may each comprise a transmitters and receivers such as transceivers (RX/TX) 1020 and 1040. In many embodiments, transceivers 1020 and 1040 implement four different PHY layers: Control PHY, SC (single carrier) PHY, OFDM PHY and low-power SC PHY (LPSC PHY). Control PHY is modulation and coding scheme 0 (MCS 0). SC starts at MCS 1 and ends at MCS 12; OFDM PHY starts at MCS 13 and ends at MCS 24; and LPSC starts at MCS 25 and ends at MCS 31. MCS 0 to MCS 4 may be mandatory PHY MCSs.

In the present embodiments, the single carrier PHY/ orthogonal frequency-division multiplexing (SC/OFDM) 1022, 1042 is just illustrative of a couple of the schemes but many embodiments are not so limited. Other embodiments may only have Control PHY and SC PHY.

SC/OFDM 1022, 1042 may implements a method of encoding digital data on multiple carrier frequencies. SC/OFDM 1022, 1042 comprises a frequency-division multiplexing scheme used as a digital multi-carrier modulation method. A large number of closely spaced orthogonal subcarrier signals are used to carry data. The data is divided into several parallel data streams or channels, one for each subcarrier. Each subcarrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver such as transceiver 1020 and 1040 may comprise a radio 1025 and 1045, respectively, and each radio 1025 and 1045 may comprise an RF transmitter and an RF receiver. The RF transmitters of transceivers 1020 and 1040 comprise an SC/OFDM 1022 and 1042, respectively, which impress digital data onto RF frequencies, also referred to as subcarriers, for transmission of the data by electromagnetic radiation. In the present embodiment, the SC/OFDM 1022 may impress the digital data such as OFDM symbols encoded with tones onto the subcarriers to for transmission. The SC/OFDM 1022 may transform information signals into signals to be applied via the radio 1025 to elements of antenna(s) 1024. An RF receiver such as an RF receiver of transceiver 1040 may receive the electromagnetic energy at an RF frequency via the elements of antenna(s) 1044 and the radio 1045. Thereafter, a space-time block decoder may transform the data streams from the space-time streams to spatial streams. The SC/OFDM 1042 may extract the digital data from the signals. And the RF receiver may demodulate, deinterleave, and decode the communication signals and pass the data to the PHY logic 1039.

In some embodiments, the communications devices 1010 and 1030 optionally comprise Digital Beam Formers (DBFs) 1023 and 1043, respectively, as indicated by the dashed lines, to form transmissions and/or to receive transmissions. Each DBF 1023 and 1043 may transform information signals into signals to be applied to elements of an antenna(s) 1024 and 1044 and/or transform signals received via the antenna(s) 1024 and 1044. The antenna(s) 1024 and 1044 may comprise an array of individual, separately excitable antenna elements. The signals applied to the elements of the antenna(s) 1024 and 1044 for transmission cause the antenna(s) 1024 and 1044 to radiate one to four spatial channels. Each spatial channel so formed may carry information to one or more of the communications devices 1030, 1050, and 1055. Similarly, the elements of the antenna(s) 1024 and 1044 may receive the signals on one to four spatial channels to generate electrical signals via the radios 1025 and 1045 to pass to the SC/OFDM 1022 and 1042, respectively.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

FIGS. 3A-B depict embodiments of flowcharts to adjust the schedule of a non-personal basic service set (PBSS) control point (PCP) device and to transmit information about a duty cycle to a PCP device. In particular, FIG. 3A depicts an embodiment of a flowchart 300 to determine a schedule. The flowchart 300 begins with scheduling logic collecting information about an active duty cycle of a non-PCP device (element 305). In some embodiments, the scheduling logic may receive a message with the information about the active duty cycle of the non-PCP device from the non-PCP device and may parse the frame to determine the indication of the duty cycle. In some embodiments, the scheduling logic may collect information about the non-PCP device based upon activities of the non-PCP device. For instance, if the non-PCP device terminates activity within the device's assigned time slot, the scheduling logic may determine an underutilization of the allocated time slot for the non-PCP device. And if the non-PCP device transmits a message indicative of entrance of the non-PCP device into a power save mode during an incomplete communication with time remaining in the allocated time slot, the scheduling logic may determine that the reason for the entering the power save mode is to prevent the non-PCP device from reaching or a risk of reaching a thermal limit.

In further embodiments, if the scheduling logic detects an ability to fully utilize a scheduled time slot by the non-PCP device and receives a request, implicit or explicit, the scheduling logic may also collect this information about the duty cycle.

After collecting information about an active duty cycle from the non-PCP device, the scheduling logic may determine an adjustment for a schedule of allocated time slots based upon the information about the duty cycle for the non-PCP device (element 310). For instance, if the information collected indicates that the non-PCP device entering a power save mode during the time slot and underutilizing the time slot, the scheduling logic may determine to reduce an allocation of time to the non-PCP device. On the other hand, if the non-PCP device uses the entire time slot assigned or at least until all communications are completed during the time slot and the scheduling logic receives an implicit or explicit request for an increased duty cycle, the scheduling logic may determine to increase the allocation of time to the non-PCP device.

In some embodiments, the scheduling logic may then determine a schedule that sets a limit on the time slot assigned to the non-PCP device based upon the information about the active duty cycle for the non-PCP device (element 320). For instance, the scheduling logic may honor the explicit duty cycle presented to the scheduling logic as a targeted duty cycle by setting an upper limit on the schedule based upon the targeted duty cycle. Furthermore, if the duty cycle information is observed information about the duty cycle, the scheduling logic may reduce or increase the scheduled time slot based upon the information and/or may set the duty cycle with a limit based upon the observed duty cycle information.

FIG. 3B depicts an embodiment of a flowchart 350 to determine, transmit, and update a duty cycle based upon a thermal measurement. The flowchart 350 begins with generating a frame with an indication of an active duty cycle (element 355). The non-PCP device may comprise duty cycle logic to maintain a duty cycle for the purposes of prevent the non-PCP device from overheating. In some embodiments, the duty cycle logic may start with an estimated duty cycle and may update the duty cycle based upon measurements during use. In some embodiments, the duty cycle logic may determine an indication of the duty cycle based upon a thermal measurement, wherein the duty cycle is indicative of a limit on active wireless communication. In several embodiments, the duty cycle logic may determine the indication of the duty cycle by determining the thermal measurement related to a current duty cycle based upon at least one of power dissipation related to communications and thermal limits associated with the non-PCP device.

To generate the frame, the duty cycle logic may generate a management frame comprising an information element with the indication of the duty cycle. In other embodiments, the duty cycle logic may generate the frame by generating a data frame as a non-PCP device with an indication that the non-PCP device is to enter a power save mode prior to completion of a communication with the PCP device. In other words, the duty cycle logic may generate a frame indicating that the device is entering a power save mode despite the time remaining in the assigned time slot and despite the amount of data left to transmit or receive that could otherwise be completed within the time slot.

Thereafter, the duty cycle logic may transmit the frame to the PCP device (element 360) by transmitting the frame to the PHY logic. The PHY logic may prepend a preamble and transmit the frame as a message via the 60 GHz communication channel to the PCP device.

The duty cycle logic may also continue to update a targeted duty cycle (element 370) and either transmit the duty cycle to the PCP device or provide information or indications on the duty cycle by transmitting an indication about entering a power save mode prior to the completion of a transmission and prior to the end of the time slot.

Figures 4A, 4B:
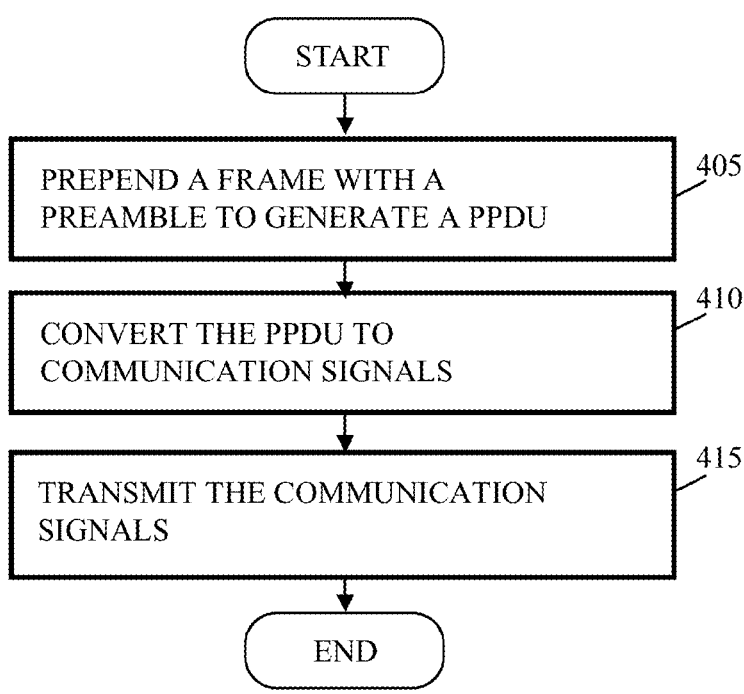
FIGS. 4A-B depict embodiments of flowcharts to transmit, receive, decode, and interpret communications with frames as illustrated in FIGS. 1-2.

FIGS. 4A-B depict embodiments of flowcharts 400 and 450 to transmit, receive, and interpret communications with a frame, or message. Referring to FIG. 4A, the flowchart 400 may begin with receiving a frame from the frame builder. The MAC sublayer logic of the communications device may generate the frame as a management frame to transmit to an access point and may pass the frame as an MAC protocol data unit (MPDU) to a data unit builder that transforms the data into a packet that can be transmitted to the access point. The data unit builder may generate a preamble to prepend the PHY service data unit (PSDU) (the MPDU from the frame builder) to form a PHY protocol data unit (PPDU) for transmission (element 405). In some embodiments, more than one MPDU may be prepended in a PPDU.

The PPDU may then be transmitted to the physical layer device such as the transceiver 1020, 1040 in FIG. 1 so the PPDU may converted to communication signals (element 410). The transmitter may then transmit the communication signals via one or more antennas or an antenna array (element 415).

Referring to FIG. 4B, the flowchart 450 begins with a receiver of a PCP device such as the receiver of transceiver 1040 in FIG. 1 receiving a communication signal via one or more antenna(s) such as an antenna element of antenna(s) 1044 (element 455). The receiver may convert the communication signal into an MPDU in accordance with the process described in the preamble (element 460). More specifically, the received signal is fed from the one or more antennas to a DBF. The DBF transforms the antenna signals into information signals. The output of the DBF is fed to OFDM module such as the SC/OFDM 1042.

The OFDM module may extract signal information from the plurality of subcarriers in each of the frequency segments onto which information-bearing signals are modulated. Then, the demodulator demodulates the signal information via, e.g., BPSK, 16-QAM, 64-QAM, 256-QAM, QPSK, or SQPSK. The signal may be deinterleaved and the frequency segments may then be deparsed.

The decoder may decode the signal information from the demodulator via, e.g., BCC or LDPC, to extract the MPDU (element 460) and transmit the MPDU to MAC sublayer logic such as MAC sublayer logic 1018 (element 465).

The MAC sublayer logic may parse the frame to determine frame field values from the MPDU (element 470). For instance, the MAC sublayer logic may determine frame field values such as the ACK policy field value of the frame.

The following examples pertain to further embodiments. One example comprises an apparatus to determine an adjustment for a schedule. The apparatus may comprise a medium access control logic to information about a duty cycle for a non-personal basic service set control point (PCP) device, wherein collecting information comprises determining information about usage of a time slot; and determine an adjustment for a schedule of allocated time slots based upon the information about the duty cycle for the non-PCP device; and a physical layer logic coupled with the medium access control logic to receive the information.

In some embodiments, the apparatus may further comprise a processor, a memory coupled with the processor, a radio coupled with the physical layer logic, and one or more antennas coupled with the radio to receive the information. In some embodiments, the medium access control logic comprises logic receive a management frame comprising an indication of the duty cycle and parse the frame to determine the indication of the duty cycle. In some embodiments, the medium access control logic comprises logic to determine an underutilization of an allocated time slot for the non-PCP device. In some embodiments, the medium access control logic comprises logic to determine entrance of the non-PCP device into a power save mode during an incomplete communication with time remaining in the allocated time slot. In some embodiments, the medium access control logic comprises logic to determine to reduce an allocation of time to the non-PCP device.

Another embodiment comprises one or more tangible computer-readable non-transitory storage media comprising computer-executable instructions operable to, when executed by at least one computer processor, enable the at least one computer processor to implement a method comprising: collecting information about a duty cycle for a non-personal basic service set control point (PCP) device, wherein collecting information comprises determining information about usage of a time slot; and determining the adjustment for the schedule of allocated time slots based upon the information about the duty cycle for the non-PCP device.

In some embodiments, collecting the information comprises receiving a management frame comprising an indication of the duty cycle. In some embodiments, collecting the information comprises determining an underutilization of an allocated time slot for the non-PCP device. In some embodiments, determining an underutilization of the allocated time slot for the non-PCP device comprises determining entrance of the non-PCP device into a power save mode during an incomplete communication with time remaining in the allocated time slot. In some embodiments, determining the adjustment comprises determining to reduce an allocation of time to the non-PCP device.

Another embodiment comprises a method to determine an adjustment for a schedule. The method may comprise collecting information about a duty cycle for a non-personal basic service set control point (PCP) device, wherein collecting information comprises determining information about usage of a time slot; and determining the adjustment for the schedule of allocated time slots based upon the information about the duty cycle for the non-PCP device.

In some embodiments, collecting the information comprises receiving a management frame comprising an indication of the duty cycle. In some embodiments, collecting the information comprises determining an underutilization of an allocated time slot for the non-PCP device. In some embodiments, determining an underutilization of the allocated time slot for the non-PCP device comprises determining entrance of the non-PCP device into a power save mode during an incomplete communication with time remaining in the allocated time slot. In some embodiments, determining the adjustment comprises determining to reduce an allocation of time to the non-PCP device.

Another embodiment comprises a system to determine an adjustment for a schedule. The system may comprise a processor; a memory coupled with the processor; a medium access control logic to information about a duty cycle for a non-personal basic service set control point (PCP) device, wherein collecting information comprises determining information about usage of a time slot; and determine an adjustment for a schedule of allocated time slots based upon the information about the duty cycle for the non-PCP device; and a physical layer logic coupled with the medium access control logic to receive the information; a radio coupled with the physical layer logic; and one or more antennas coupled with the radio to receive the information.

In some embodiments, the medium access control logic comprises logic receive a management frame comprising an indication of the duty cycle and parse the frame to determine the indication of the duty cycle. In some embodiments, the medium access control logic comprises logic to determine an underutilization of an allocated time slot for the non-PCP device. In some embodiments, the medium access control logic comprises logic to determine entrance of the non-PCP device into a power save mode during an incomplete communication with time remaining in the allocated time slot. In some embodiments, the medium access control logic comprises logic to determine to reduce an allocation of time to the non-PCP device.

Another embodiment comprises an apparatus to transmit information indicative of a duty cycle. The apparatus may comprise a medium access control logic to determine an indication of the duty cycle based upon a thermal measurement, wherein the duty cycle is indicative of a limit on active wireless communication; and to generate a frame comprising the indication of the duty cycle; and a physical layer logic coupled with the medium access control logic to transmit the frame to a personal basic service set control point (PCP) device.

In some embodiments, the apparatus may further comprise a processor, a memory coupled with the processor, a radio coupled with the physical layer logic, and one or more antennas coupled with the radio to receive the information. In some embodiments, the medium access control logic comprises logic to determine the thermal measurement related to a current duty cycle based upon at least one of power dissipation related to communications and thermal limits associated with the non-PCP device. In some embodiments, the medium access control logic comprises logic to generate a management frame comprising an information element with the indication of the duty cycle. In some embodiments, the medium access control logic comprises logic to generate a data frame by a non-PCP device with an indication that the non-PCP device is to enter a power save mode prior to completion of a communication with the PCP device.

Another embodiment comprises one or more tangible computer-readable non-transitory storage media comprising computer-executable instructions operable to, when executed by at least one computer processor, enable the at least one computer processor to implement a method comprising: determining an indication of the duty cycle based upon a thermal measurement, wherein the duty cycle is indicative of a limit on active wireless communication; generating a frame comprising the indication of the duty cycle; and transmitting the frame to a physical layer logic to transmit the frame a personal basic service set control point (PCP) device.

In some embodiments, determining the indication of the duty cycle comprises determining the thermal measurement related to a current duty cycle based upon at least one of power dissipation related to communications and thermal limits associated with the non-PCP device. In some embodiments, generating the frame comprises generating a management frame comprising an information element with the indication of the duty cycle. In some embodiments, generating the frame comprises generating a data frame by a non-PCP device with an indication that the non-PCP device is to enter a power save mode prior to completion of a communication with the PCP device.

Another embodiment comprises a system to transmit information indicative of a duty cycle. The system may comprise a processor; a memory coupled with the processor; a medium access control logic to determine an indication of the duty cycle based upon a thermal measurement, wherein the duty cycle is indicative of a limit on active wireless communication; and to generate a frame comprising the indication of the duty cycle; and a physical layer logic coupled with the medium access control logic to transmit the frame to a personal basic service set control point (PCP) device; a radio coupled with the physical layer logic; and one or more antennas coupled with the radio to transmit the information.

In some embodiments, the medium access control logic comprises logic to the thermal measurement related to a current duty cycle based upon at least one of power dissipation related to communications and thermal limits associated with the non-PCP device. In some embodiments, the medium access control logic comprises logic to generate a management frame comprising an information element with the indication of the duty cycle. In some embodiments, the medium access control logic comprises logic to generate a data frame by a non-PCP device with an indication that the non-PCP device is to enter a power save mode prior to completion of a communication with the PCP device.

Another embodiment comprises a method to transmit information indicative of a duty cycle. The method may comprise determining an indication of the duty cycle based upon a thermal measurement, wherein the duty cycle is indicative of a limit on active wireless communication; generating a frame comprising the indication of the duty cycle; and transmitting the frame to a personal basic service set control point (PCP) device.

In some embodiments, determining the indication of the duty cycle comprises determining the thermal measurement related to a current duty cycle based upon at least one of power dissipation related to communications and thermal limits associated with the non-PCP device. In some embodiments, generating the frame comprises generating a management frame comprising an information element with the indication of the duty cycle. In some embodiments, generating the frame comprises generating a data frame by a non-PCP device with an indication that the non-PCP device is to enter a power save mode prior to completion of a communication with the PCP device.

Another embodiment comprises an apparatus to transmit a physical layer frame. The apparatus may comprise a means for collecting information about a duty cycle for a non-personal basic service set control point (PCP) device, wherein collecting information comprises determining information about usage of a time slot; and a means for determining the adjustment for the schedule of allocated time slots based upon the information about the duty cycle for the non-PCP device. In some embodiments, the means for collecting the information comprises a means for receiving a management frame comprising an indication of the duty cycle. In some embodiments, the means for collecting the information comprises a means for determining an underutilization of an allocated time slot for the non-PCP device. In some embodiments, the means for determining an underutilization of the allocated time slot for the non-PCP device comprises a means for determining entrance of the non-PCP device into a power save mode during an incomplete communication with time remaining in the allocated time slot. In some embodiments, the means for determining the adjustment comprises a means for determining to reduce an allocation of time to the non-PCP device.

Another embodiment comprises an apparatus to interpret a physical layer frame. The apparatus may comprise a means for determining an indication of the duty cycle based upon a thermal measurement, wherein the duty cycle is indicative of a limit on active wireless communication; a means for generating a frame comprising the indication of the duty cycle and a means for transmitting the frame to a personal basic service set control point (PCP) device.

In some embodiments, the means for determining the indication of the duty cycle comprises a means for determining the thermal measurement related to a current duty cycle based upon at least one of power dissipation related to communications and thermal limits associated with the non-PCP device. In some embodiments, the means for generating the frame comprises a means for generating a management frame comprising an information element with the indication of the duty cycle. In some embodiments, the means for generating the frame comprises a means for generating a data frame by a non-PCP device with an indication that the non-PCP device is to enter a power save mode prior to completion of a communication with the PCP device.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus to determine an adjustment for a schedule, the apparatus comprising:
   a medium access control logic to determine a schedule of time slots comprising a time slot allocated to a non-personal basic service set control point (non-PCP) device for a communication;
   to collect information about the non-PCP device in response to truncation of the time slot allocated to the non-PCP device by the non-PCP device prior to completion of the communication; and
   to determine an adjustment for a subsequent time slot allocated to the non-PCP device in a subsequent beacon interval based upon the information, the adjustment to reduce a duration of the subsequent time slot in response to the truncation of the time slot allocated to the non-PCP device by the non-PCP device; and
   a physical layer logic coupled with the medium access control logic to receive the information.

2. The apparatus of claim 1, further comprising a processor, a memory coupled with the processor, a radio coupled with the physical layer logic, and one or more antennas coupled with the radio to receive the information.

3. The apparatus of claim 1, wherein the medium access control logic comprises logic to receive a management frame comprising an indication of the duty cycle and parse the frame to determine the indication of the duty cycle.

4. The apparatus of claim 1, wherein the medium access control logic comprises logic to determine an underutilization of the time slot allocated for the non-PCP device.

5. The apparatus of claim 1, wherein the medium access control logic comprises logic to determine entrance of the non-PCP device into a power save mode during an incomplete communication with time remaining in the time slot allocated.

6. The apparatus of claim 5, wherein the medium access control logic comprises logic to determine to reduce an allocation of time to the non-PCP device based upon entrance of the non-PCP device into the power save mode.

7. One or more tangible computer-readable non-transitory storage media comprising computer-executable instructions operable to, when executed by at least one computer processor, enable the at least one computer processor to implement a method comprising:
   determining a schedule of time slots comprising a time slot allocated to a non-personal basic service set control point (non-PCP) device for a communication;
   collecting information about the non-PCP device in response to truncation of the time slot allocated to the non-PCP device by the non-PCP device prior to completion of the communication; and
   determining an adjustment for a subsequent time slot allocated to the non-PCP device in a subsequent beacon interval based upon the information, the adjustment to reduce a duration of the subsequent time slot in response to the truncation of the time slot allocated to the non-PCP device by the non-PCP device.

8. The storage media of claim 7, wherein collecting the information comprises receiving a management frame comprising an indication of an active duty cycle for the non-PCP device.

9. The storage media of claim 7, wherein collecting the information comprises determining an underutilization of the time slot allocated to the non-PCP device.

10. The storage media of claim 9, wherein determining the underutilization of the time slot allocated to the non-PCP device comprises determining entrance of the non-PCP device into a power save mode during an incomplete communication with time remaining in the time slot allocated to the non-PCP device.

11. The storage media of claim 10, wherein determining the adjustment comprises determining to reduce an allocation of time to the non-PCP device based upon entrance of the non-PCP device into the power save mode.

12. A method to determine an adjustment for a schedule, the method comprising:
    determining a schedule of time slots comprising a time slot allocated to a non-personal basic service set control point (non-PCP) device for a communication;
    collecting information about the non-PCP device in response to truncation of the time slot allocated to the non-PCP device by the non-PCP device prior to completion of the communication; and
    determining an adjustment for a subsequent time slot allocated to the non-PCP device in a subsequent beacon interval based upon the information, the adjustment to reduce a duration of the subsequent time slot in response to the truncation of the time slot allocated to the non-PCP device by the non-PCP device.

13. The method of claim 12, wherein collecting the information comprises receiving a management frame comprising an indication of an active duty cycle.

14. The method of claim 12, wherein collecting the information comprises determining an underutilization of the time slot allocated to the non-PCP device.

15. The method of claim 14, wherein determining the underutilization of the time slot allocated to the non-PCP device comprises determining entrance of the non-PCP device into a power save mode during an incomplete communication with time remaining in the time slot allocated to the non-PCP device.

16. An apparatus to transmit information about a duty cycle, the apparatus comprising;
    a medium access control logic to determine the information about the duty cycle, wherein the duty cycle is based upon a thermal dissipation capability of the apparatus and heat generation by active transmission and reception of communications by the apparatus, wherein the information about the duty cycle indicates a capability of a non-personal basic service set control point (non-PCP) device to remain active, transmitting and receiving communications, for a portion of a time period; and to generate a frame comprising the information about the duty cycle; and
    a physical layer logic coupled with the medium access control logic to transmit the frame to a PCP device.

17. The apparatus of claim 16, further comprising a processor, a memory coupled with the processor, a radio coupled with the physical layer logic, and one or more antennas coupled with the radio to receive the information.

18. The apparatus of claim 16, wherein the medium access control logic comprises logic to determine a thermal measurement related to a current duty cycle based upon at least one of power dissipation related to communications and thermal limits associated with the non-PCP device.

19. The apparatus of claim 16, wherein the medium access control logic comprises logic to generate a data frame by a non-PCP device with an indication that the non-PCP device is to enter a power save mode prior to completion of a communication with the PCP device.

20. One or more tangible computer-readable non-transitory storage media comprising computer-executable instructions operable to, when executed by at least one computer processor, enable the at least one computer processor to implement a method comprising:
    determining information about a duty cycle, wherein the duty cycle is based upon a thermal dissipation capability of an apparatus and heat generation by active transmission and reception of communications by the apparatus, wherein the information about the duty cycle indicates a capability of a non-personal basic service set control point (non-PCP) device to remain active, transmitting and receiving communications, for a portion of a time period;
    generating a frame comprising the information about the duty cycle; and
    transmitting the frame to a physical layer logic to transmit the frame to a PCP device.

21. The storage media of claim 20, wherein determining the information about the duty cycle comprises determining a thermal measurement related to a current duty cycle based upon at least one of power dissipation related to communications and thermal limits associated with the non-PCP device.

22. The storage media of claim 20, wherein generating the frame comprises generating a management frame comprising an information element with the information about the duty cycle.

23. A method to transmit information about a duty cycle, the method comprising:
    determining information about the duty cycle, wherein the duty cycle is based upon a thermal dissipation capability of an apparatus and heat generation by active transmission and reception of communications by the apparatus, wherein the information about the duty cycle indicates a capability of a non-personal basic service set control point (non-PCP) device to remain active, transmitting and receiving communications, for a portion of a time period;
    generating a frame comprising the information about the duty cycle; and
    transmitting the frame to a physical layer logic to transmit the frame to a PCP device.

24. The method of claim 23, wherein determining the information about the duty cycle comprises determining a thermal measurement related to a current duty cycle based upon at least one of power dissipation related to communications and thermal limits associated with the non-PCP device.

25. The method of claim 23, wherein generating the frame comprises generating a management frame comprising an information element with the information about the duty cycle.

* * * * *